(12) United States Patent
Jang

(10) Patent No.: US 10,321,184 B2
(45) Date of Patent: Jun. 11, 2019

(54) ELECTRONIC APPARATUS AND CONTROLLING METHOD THEREOF

(71) Applicant: SAMSUNG ELECTRONICS CO., LTD., Suwon-si (KR)

(72) Inventor: Tae-young Jang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/705,937

(22) Filed: Sep. 15, 2017

(65) Prior Publication Data
US 2018/0167665 A1    Jun. 14, 2018

(30) Foreign Application Priority Data

Dec. 13, 2016 (KR) .................. 10-2016-0169655

(51) Int. Cl.
*H04N 21/439* (2011.01)
*H04N 21/434* (2011.01)
*G11B 20/10* (2006.01)

(52) U.S. Cl.
CPC ... *H04N 21/4392* (2013.01); *G11B 20/10527* (2013.01); *H04N 21/434* (2013.01); *H04N 21/439* (2013.01); *H04N 21/4341* (2013.01); *G11B 2020/10546* (2013.01); *G11B 2020/10675* (2013.01); *G11B 2020/10759* (2013.01); *G11B 2020/10777* (2013.01)

(58) Field of Classification Search
CPC ..... G06T 13/80; G06T 11/60; G10L 21/0208; H04N 19/40; H04N 21/4392; H04N 9/802; G11B 27/031; H04W 4/12; G06F 17/241

USPC .......... 358/1.15; 380/201; 700/94; 704/500; 715/234, 727; 341/61; 360/18; 369/30.26, 124.03; 370/465, 516, 338; 381/107; 386/207, 201, 230, 239, 241, 386/244, 246, 291, 329; 709/231, 219; 710/69; 348/14.12, 231.3, 231.4, 482, 348/515; 375/240.28; 725/32, 94, 116, 725/146

See application file for complete search history.

(56) References Cited

U.S. PATENT DOCUMENTS 5,101,274 A * 3/1992 Yoshimura ......... G11B 27/3036
                                                    348/476
5,870,355 A * 2/1999 Fujihara ................. G11B 19/02
                                                    369/30.26
(Continued)

FOREIGN PATENT DOCUMENTS

JP       4338083 B2    9/2009
KR    10-2003-0031700 A    4/2003
(Continued)

*Primary Examiner* — Gerald Gauthier
(74) *Attorney, Agent, or Firm* — Sughrue Mion, PLLC

(57) ABSTRACT

An electronic apparatus and a controlling method thereof are provided. The electronic apparatus includes a buffer configured to store audio data of an audio stream; and a processor configured to decode the audio data stored in the buffer, wherein the processor is further configured to determine a reproducing time corresponding to the audio data stored in the buffer, compare the reproducing time and a predetermined reproducing time, and control a storage amount of the audio data in the buffer so that an amount of the audio data corresponding to the predetermined reproducing time can be maintained in the buffer.

15 Claims, 8 Drawing Sheets

(56) References Cited

U.S. PATENT DOCUMENTS

| | | | | |
|---|---|---|---|---|
| 6,209,028 B1* | 3/2001 | Walker | | H04N 7/17318 |
| | | | | 348/E7.071 |
| 6,967,599 B2* | 11/2005 | Choi | | G10L 21/04 |
| | | | | 341/61 |
| 7,283,175 B2 | 10/2007 | Johnson et al. | | |
| 7,681,223 B2* | 3/2010 | Takahashi | | H04H 20/18 |
| | | | | 709/231 |
| 9,596,578 B1* | 3/2017 | Clark | | H04W 4/12 |
| 2003/0231871 A1* | 12/2003 | Ushimaru | | H04N 21/4104 |
| | | | | 386/207 |
| 2004/0001155 A1* | 1/2004 | Mizobuchi | | G11B 27/102 |
| | | | | 348/231.3 |
| 2004/0103446 A1* | 5/2004 | Yagi | | H04N 21/234363 |
| | | | | 725/146 |
| 2004/0252978 A1* | 12/2004 | Jung | | G11B 20/10527 |
| | | | | 386/246 |
| 2007/0014539 A1* | 1/2007 | Kohno | | G11B 27/10 |
| | | | | 386/230 |
| 2007/0030387 A1* | 2/2007 | Kim | | H04N 5/04 |
| | | | | 348/515 |
| 2007/0058934 A1* | 3/2007 | Yamanaka | | H04N 21/23406 |
| | | | | 386/329 |
| 2007/0065112 A1* | 3/2007 | Yamada | | H04N 5/04 |
| | | | | 386/201 |
| 2007/0116041 A1* | 5/2007 | Hashimoto | | H04N 21/2368 |
| | | | | 370/465 |
| 2007/0118850 A1* | 5/2007 | Bertin | | H04N 21/4307 |
| | | | | 725/32 |
| 2008/0013512 A1* | 1/2008 | Yurugi | | H04N 21/233 |
| | | | | 370/338 |
| 2008/0037151 A1* | 2/2008 | Fujimoto | | G11B 20/10 |
| | | | | 360/18 |
| 2008/0162716 A1* | 7/2008 | Kayanuma | | G06F 12/0802 |
| | | | | 709/231 |
| 2008/0166106 A1* | 7/2008 | Ozawa | | G11B 27/34 |
| | | | | 386/244 |
| 2008/0298242 A1 | 12/2008 | Fan et al. | | |
| 2009/0172220 A1* | 7/2009 | Lai | | G06F 3/16 |
| | | | | 710/69 |
| 2010/0061466 A1* | 3/2010 | Gozen | | G10L 19/167 |
| | | | | 375/240.28 |
| 2010/0067868 A1* | 3/2010 | Moore | | H04N 5/76 |
| | | | | 386/291 |
| 2011/0110516 A1* | 5/2011 | Satoh | | G06F 21/10 |
| | | | | 380/201 |
| 2011/0176032 A1* | 7/2011 | Kajimura | | G10K 11/175 |
| | | | | 348/231.4 |
| 2011/0208330 A1* | 8/2011 | Oomae | | G10H 1/0033 |
| | | | | 700/94 |
| 2011/0246206 A1* | 10/2011 | Kim | | G10L 19/167 |
| | | | | 704/500 |
| 2012/0008487 A1* | 1/2012 | Iriyama | | G11B 20/10527 |
| | | | | 369/124.03 |
| 2012/0033939 A1* | 2/2012 | Murakami | | H04N 5/76 |
| | | | | 386/239 |
| 2012/0082430 A1* | 4/2012 | Song | | G11B 27/102 |
| | | | | 386/241 |
| 2012/0084455 A1* | 4/2012 | McCue | | H04N 21/235 |
| | | | | 709/231 |
| 2012/0169837 A1* | 7/2012 | Olofsson | | H04N 7/147 |
| | | | | 348/14.12 |
| 2013/0047074 A1* | 2/2013 | Vestergaard | | G06F 3/14 |
| | | | | 715/234 |
| 2014/0201798 A1* | 7/2014 | Kazui | | H04N 21/23614 |
| | | | | 725/116 |
| 2015/0110134 A1* | 4/2015 | Kozica | | H04N 21/44004 |
| | | | | 370/516 |
| 2015/0317123 A1* | 11/2015 | Wu | | H04L 65/1089 |
| | | | | 715/727 |
| 2015/0326745 A1* | 11/2015 | Dong | | H04N 1/00204 |
| | | | | 358/1.15 |
| 2015/0363411 A1* | 12/2015 | Du | | G06F 17/3074 |
| | | | | 700/94 |
| 2016/0232699 A1* | 8/2016 | Nam | | G06T 1/20 |
| 2016/0254795 A1* | 9/2016 | Ballard | | H04N 21/43615 |
| | | | | 381/107 |
| 2016/0267919 A1* | 9/2016 | Cao | | H04N 21/4392 |
| 2016/0292141 A1* | 10/2016 | Liu | | G06F 17/241 |
| 2016/0292897 A1* | 10/2016 | Gabor | | G06F 3/165 |
| 2017/0142430 A1* | 5/2017 | Vestergaard | | H04N 19/40 |
| 2017/0163955 A1* | 6/2017 | Zheng | | G11B 27/28 |
| 2017/0330595 A1* | 11/2017 | Ishida | | G10L 21/04 |

FOREIGN PATENT DOCUMENTS

| | | |
|---|---|---|
| KR | 10-2008-0106090 A | 12/2008 |
| KR | 10-1055169 B1 | 8/2011 |
| WO | 2007/110692 A1 | 10/2007 |

* cited by examiner

ELECTRONIC APPARATUS AND CONTROLLING METHOD THEREOF

CROSS-REFERENCE TO RELATED APPLICATIONS

This application claims priority from Korean Patent Application No. 10-2016-0169655, filed on Dec. 13, 2016 in the Korean Intellectual Property Office, the disclosure of which is incorporated herein by reference in its entirety.

BACKGROUND

Field

Apparatuses and methods consistent with the present disclosure relate to an electronic apparatus and a controlling method thereof, and particularly, to an electronic apparatus configured to adjust the amount of data in a buffer so that a silence section that occurs during audio source conversion is uniform for all audio sources, and a controlling method thereof.

Description of the Related Art

As the size of contents data increases, technology for compressing data and encoding the data for encryption has been widely used. For example, as a standard for compressing video data, audio data and the like, the technology of encoding data in a Moving Picture Experts Group 2 (MPEG-2) format has been used.

In a record medium such as a digital versatile disc (DVD), a program stream (PS), in which video data and audio data encoded in an MPEG-2 format are multiplexed, is recorded, and in a broadcasting system such as Digital Video Broadcasting (DVB), Advanced Television Systems Committee (ATSC) and Internet Protocol television (IPTV), video data and audio data, encoded in an MPEG-2 format, are multiplexed in packet units, and a transport stream (TS), which is a sequential stream of such packets, is used. Further, the transport stream (TS) is also used in recording media such as Blu-ray disc (BD) and HD DVD.

In order to reproduce video and audio included in such a stream, a reproducing device individually de-multiplexes encoded video data and audio data included in the stream, and individually decodes each of the de-multiplexed video data and audio data, and reproduces the same. The reproducing device temporarily stores the video data and audio data in a buffer, and controls the outputting timing of the buffer where the audio data is stored and of the buffer where the video data is stored, so that the video data and audio data are synchronized to each other and output accordingly. In such a case, if a user converts an audio source from French to English for example, the reproducing device removes all the audio data from the buffer where the audio data corresponding to French is stored, and stores the audio data corresponding to English in the buffer. The process of removing all the data in the buffer as aforementioned is called 'buffer flush'.

The reproducing device needs to control the amount of audio data in the buffer to be maintained to a certain amount in order to prevent buffer underrun. Therefore, when a buffer flush occurs due to an audio source conversion, a silence section occurs, that is, where audio as much as the amount of the data removed from the buffer is not output.

In the related art, the amount of data to be stored in a buffer is adjusted based on a certain number of frames or a certain size of data, and thus audio data of different reproduction lengths are stored in the buffer depending on the attributes or specification (spec) of the audio data. Therefore, in the case of a plurality of audio data having different attributes, the length of the silence section that occurs in the case of an audio source conversion had to be different from one another. Thus, there is a problem that, for a user who does not know this situation, the silence section not being uniform may be misunderstood as being caused by a malfunction of the reproducing device.

SUMMARY

Example embodiments provide an electronic apparatus configured to adjust the amount of data in a buffer so that a silence section occurred during audio source conversion is uniform for all audio sources, and a controlling method thereof.

According to an aspect of an example embodiment, there is provided an electronic apparatus including: a buffer configured to store audio data of an audio stream; and a processor configured to decode the audio data stored in the buffer, wherein the processor is further configured to determine a reproducing time corresponding to the audio data stored in the buffer, compare the reproducing time and a predetermined reproducing time, and control a storage amount of the audio data in the buffer so that an amount of the audio data corresponding to the predetermined reproducing time can be maintained in the buffer.

The electronic apparatus may further include a storage configured to store specification information of an audio source corresponding to the audio stream, wherein the processor may be further configured to determine the reproducing time corresponding to the audio data stored in the buffer based on the specification information of the audio source.

The specification information of the audio source may include information of the reproducing time per frame, and the processor may be further configured to determine a number of frames corresponding to the audio data stored in the buffer, and determine the reproducing time of the audio data stored in the buffer based on the number of frames and the information of the reproducing time per frame.

The specification information of the audio source may include information of the reproducing time per frame and information of a data size per frame, and the processor may be further configured to determine a size of the audio data stored in the buffer, and determine the reproducing time of the audio data stored in the buffer based on the size of the audio data, the information of the data size per frame and the information of the reproducing time per frame.

The processor may be further configured to, in response to an audio source conversion command being input, remove the audio data stored in the buffer, and store, in the buffer, audio data of a converted source of an amount corresponding to the predetermined reproducing time.

The electronic apparatus may further include an outputter configured to output audio and video, wherein the processor may be further configured to demultiplex input contents data, divide the demultiplexed contents data into the audio data and video data, store the audio data in the buffer, and output audio corresponding to the audio data and video corresponding to the video data through the outputter.

The processor may be further configured to, in response to receiving a command for converting a language of the audio corresponding to the video currently output, remove the audio data stored in the buffer, and store, in the buffer, audio data corresponding to the converted language of an amount corresponding to the predetermined reproducing time.

The input contents data may correspond to contents stored in a Blu-ray disc (BD) or a digital video disc (DVD), or contents recorded using a personal video recorder (PVR).

According to an aspect of another example embodiment, there is provided a method of controlling an electronic apparatus, the method including: storing audio data of an audio stream in a buffer; and decoding the audio data stored in the buffer, wherein the storing includes: determining a reproducing time corresponding to the audio data stored in the buffer; comparing the reproducing time and a predetermined reproducing time; and controlling a storage amount of the audio data in the buffer so that an amount of the audio data corresponding to the predetermined reproducing time can be maintained in the buffer.

The electronic apparatus may store specification information of an audio source corresponding to the audio stream, and the determining the reproducing time may include determining the reproducing time corresponding to the audio data stored in the buffer based on the specification information of the audio source.

The specification information of the audio source may include information of the reproducing time per frame, and the determining the reproducing time corresponding to the audio data stored in the buffer based on the specification information of the audio source may include determining a number of frames corresponding to the audio data stored in the buffer, and determining the reproducing time of the audio data stored in the buffer based on the number of frames and the information of the reproducing time per frame.

The specification information of the audio source may include information of the reproducing time per frame and information of a data size per frame, and the determining the reproducing time corresponding to the audio data stored in the buffer based on the specification information of the audio source may include determining a size of the audio data stored in the buffer, and determining the reproducing time of the audio data stored in the buffer based on the size of the audio data stored in the buffer, the information of the data size per frame and the information of the reproducing time per frame.

The controlling method may further include, in response to an audio source conversion command being input, removing the audio data stored in the buffer, and storing, in the buffer, audio data of a converted source of an amount corresponding to the predetermined reproducing time.

The method may further include demultiplexing input contents data and dividing the demultiplexed contents data into the audio data and video data; and outputting audio corresponding to the audio data and video corresponding to the video data, wherein the storing may include storing the demultiplexed and divided audio stream of a certain unit data in the buffer.

The method may further include, in response to receiving a command for converting a language of the audio corresponding to the video currently being output, removing the audio data stored in the buffer, and storing, in the buffer, audio data corresponding to the converted language of an amount corresponding to the predetermined reproducing time.

The input contents data may correspond to contents stored in a Blu-ray disc (BD) or a digital video disc (DVD), or contents recorded using a personal video recorder (PVR).

According to an aspect of another example embodiment, there is provided a non-transitory computer readable record medium storing a program instructions that are executed by a computer to perform a method of controlling an electronic apparatus, the method including: storing audio data of an audio stream in a buffer; and decoding the audio data stored in the buffer, wherein the storing includes determining a reproducing time corresponding to the audio data stored in the buffer; comparing the reproducing time and a predetermined reproducing time; and controlling a storage amount of the audio data in the buffer so that an amount of the audio data corresponding to the predetermined reproducing time can be maintained in the buffer.

BRIEF DESCRIPTION OF THE DRAWINGS

The above and/or other aspects will be more apparent by describing certain example embodiments with reference to the accompanying drawings, in which.

DETAILED DESCRIPTION OF EXAMPLE EMBODIMENTS

Figure 1:
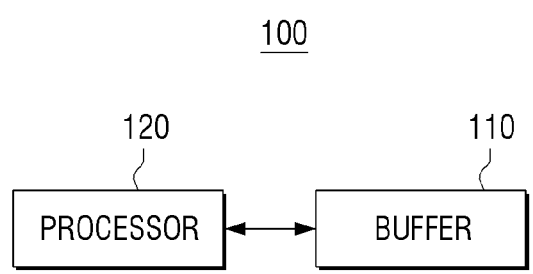
FIG. 1 is a block diagram provided to explain a configuration of an electronic apparatus according to an example embodiment.

In the present disclosure, if a specific description of a related well-known function or configuration is deemed to obscure the gist of the present disclosure, its detailed description is omitted. The terms used in the present disclosure are terms defined in consideration of the functions of the example embodiments. However, these terms may vary depending on the intention or relationship of the user or operator. Therefore, their definitions shall be made based on the overall contents of the present disclosure.

The terms including numerical expressions such as a first, a second and the like may be used to explain various components, but there is no limitation thereto. These terms are used only for the purpose of differentiating one component from others.

The terms used in the present disclosure are used only to describe a certain embodiment, and not to limit the scope of rights. A singular expression includes a plural expression unless clearly mentioned otherwise. Herein, terms such as "include/including" and "consists of/consisting of" should be construed as designating that there are such characteristics, numbers, steps, operations, elements, components or a combination thereof, not to exclude the presence or possibility of adding one or more of other characteristics, numbers, steps, operations, elements, components or a combination thereof.

In the example embodiments of the present disclosure, a 'module' or 'unit' performs at least one function or operation, and may be realized as hardware (e.g., a processor or integrated circuit) or software or a combination thereof. Further, a plurality of 'modules' or a plurality of 'units' may be integrated into at least one module and implemented as at least one processor except for 'modules' or 'units' that need to be implemented as hardware.

Hereinafter, example embodiments of the present disclosure will be described in detail with reference to the drawings attached such that they may be easily carried out by a person skilled in the art. However, the present disclosure may be realized in various forms, and is not limited to the example embodiments described herein. Further, in the drawings, any portion irrelevant to clearly describing the example embodiments is omitted, and throughout the present disclosure, like reference numerals indicate like configurations.

FIG. 1 is a block diagram provided to explain a configuration of an electronic apparatus 100 according to an example embodiment of the present disclosure.

The electronic apparatus 100 may be an electronic apparatus capable of reproducing multimedia data, such as television (TV), a digital television (DTV), a personal computer (PC), smart phone, tablet, digital video disc (DVD) player, and Blu-ray player, etc.

Referring to FIG. 1, the electronic apparatus 100 includes a buffer 110 and a processor 120.

The buffer 110 is configured to store data of a certain unit data at a time before decoding an audio stream.

The buffer 110 may be implemented as a certain space in a memory device, or as the memory device itself. Here, the memory device may be nonvolatile memory, volatile memory, flash-memory, hard disk drive (HDD) or solid state drive (SSD), etc.

The processor 120 controls overall operations of each component that forms the electronic apparatus 100. The processor 120 may include a central processing unit (CPU), a random-access memory (RAM), a read-only memory (ROM), and system bus. The processor 120 may be implemented as for example, a micro computer (MICOM), and application specific integrated circuit (ASIC), etc.

The processor 120 may control the amount of audio data being stored in the buffer 110. Specifically, the processor 120 may calculate the reproducing time corresponding to the audio data stored in the buffer 110, and compare the calculated reproducing time and a predetermined reproducing time and control the storage amount of audio data in the buffer 110 so as to maintain the amount of audio data corresponding to the predetermined reproducing time.

Further, when an audio source conversion command is input, the processor 120 may remove the audio data stored in the buffer 110, and store, in the buffer, the audio data of a converted source as much as an amount corresponding to the predetermined reproducing time.

Here, the predetermined reproducing time may be set to a certain time, or may be changed according to a user setting. For example, the predetermined reproducing time may be set to 35±5 ms, for example.

According to the present disclosure, in both a case where audio data of a first audio source is stored in the buffer 110 and a case where audio data of a second source having different attributes from the first audio source (for example, having different reproducing time per frame) is stored in the buffer 110, the amount of audio data being stored in the buffer 110 may be set to match the predetermined reproducing time.

According to the related art, the amount of audio data being stored in the buffer 110 is controlled based on a certain number of frames or a certain data size (or buffer capacity), and thus data of a different reproducing time depending on the attributes or specification (spec) of the audio source is stored in the buffer 110. Accordingly, when an audio source conversion (or buffer flash) occurs, audio data of the next audio source is filled in the buffer 110, and thus a problem occurs where the time spent until audio is output normally, that is, the length of a silence section differs per audio source.

However, according to an example embodiment, even when the audio sources have different specs, the lengths of the silence sections may be identical, or the lengths of the silence sections may be extremely similar to the extent that a difference is not recognizable by humans (several ms).

In IEC 60958, 61937, the spec of each audio source is specified. Hereinbelow, Table 1 shows an example of some of the audio sources.

TABLE 1

| Codec type | Sampling Frequency (Default 48, unit: KHz) | | | | | unit | time per frame (unit: ms) | notes |
| --- | --- | --- | --- | --- | --- | --- | --- | --- |
| | 32 | 44.1 | 48 | 96 | 192 | | | |
| LPCM | | | 240 | 480 | 960 | GOLS | 5 | |
| AC3 | | | 1536 | | | sample | 32 | |
| EAC3 | | 1536 * (1 + n) (n = dependent frame) | | | | sample | 32 | only calculate independent frame |
| DD Loseless | | N/A | 40 | 80 | 160 | | 8.33 | |
| DTS | | | 512 | | | sample | 10.66 | |
| DTS HD | | 512 * 2 (core sub-stream, extension sub-stream) | | | | sample | 10.66 | only calculate core sub-stream |
| AAC | | | 1024 | | | sample | 21.33 | |
| HEAAC-SBR ON | | | 2048 | | | sample | 42.66 | |
| HEAAC-SBR OFF | | | 1024 | | | sample | 21.33 | |
| MPEG | | | 1152 | | | sample | 24 | |

Referring to Table 1, one can see that the audio sources have different sample frequencies and different reproducing times per frame.

Hereinafter, a case of storing audio data of a certain number of frames in a buffer 110 regardless of the spec of the audio source according to the related art will be explained based on FIGS. 2 to 3.

Figure 2:
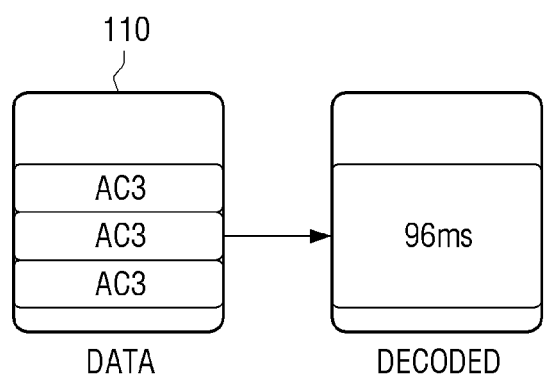
FIGS. 2 to 3 are views provided to explain a case where audio data is stored in a buffer, the audio data being stored each time by a certain number of frames.
Figure 3:
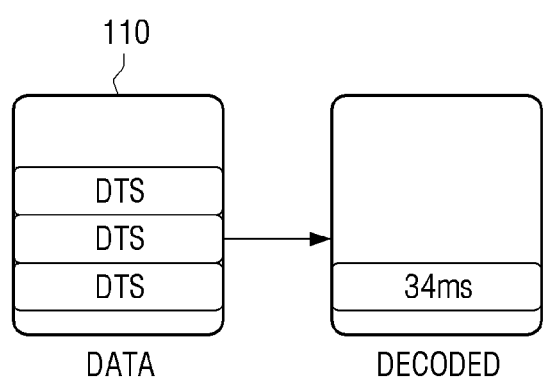

FIG. 2 is a view provided to explain a case of storing, in the buffer 110, audio data of an audio source having codec type AC3, the audio data stored in the buffer 110 each time being three frames, and FIG. 3 is a view provided to explain a case of storing, in the buffer 110, audio data of an audio source having codec type DTS, the audio data stored in the buffer 110 each time being three frames.

Referring to FIGS. 2 and 3, in the case of AC3, the reproducing time of the decoded audio data is 96 ms, and in the case of DTS, the reproducing time of the decoded audio data is 34 ms. That is, the reproducing times are not the same even if the number of frames are the same, that is, three.

As another example, hereinafter, a case of storing audio data of a certain data size in a buffer 110 regardless of the spec of the audio source according to the related art will be explained based on FIGS. 4 to 5.

Figure 4:
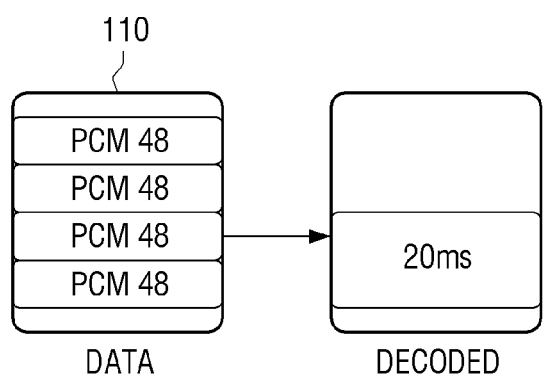
FIGS. 4 to 5 are views provided to explain a case where audio data is stored in a buffer, the audio data being stored each time by a certain size of data.
Figure 5:
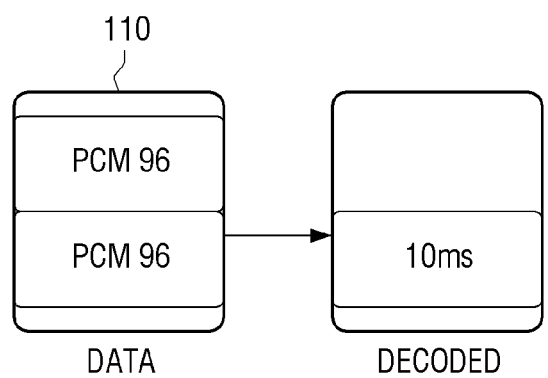

FIG. 4 illustrates a case of an audio source having codec type PCM48K, and FIG. 5 illustrates a case of an audio source having codec type PCM96K. As can be seen in FIGS. 4 and 5, 4 frames of audio data of the audio source, PCM48k, is stored in the buffer 110, and 2 frames of audio data of the audio source, PCM96K, is stored in the buffer 110, such that the audio data of a certain data size is stored in the buffer 110. That is, the size of the audio data stored in the buffer 110 of FIG. 4 and the size of the audio data stored in the buffer 110 of FIG. 5 are identical to each other.

Referring to FIGS. 4 and 5, in the case of PCM48K, the reproducing time of the decoded data is 20 ms, and in the case of PCM96K, the reproducing time of the decoded data is 10 ms. That is, even when the data size is the same, the reproducing time is not the same.

Figure 6:
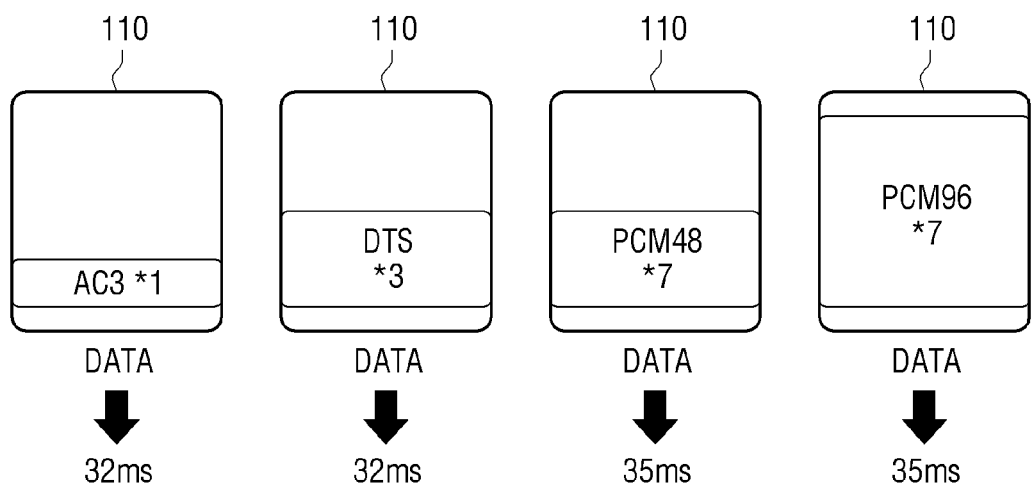
FIG. 6 is a view provided to explain a case where audio data is stored in a buffer, the audio data being stored each time by an amount corresponding to a certain reproducing time.

Unlike in the related art as explained in FIGS. 2 to 5, according to an example embodiment, audio data of an amount corresponding to a certain reproducing time is stored in the buffer 110. FIG. 6 illustrates examples of some audio sources.

Specifically, FIG. 6 illustrates a case where a target reproducing time is set to 35±5 ms. Referring to FIG. 6, in order to correspond to the target reproducing time, in the case of AC3, one frame is stored in the buffer 110 each time, in the case of DTS, three frames are stored in the buffer 110 each time, in the case of PCM48K, seven frames are stored in the buffer 110 each time, and in the case of PCM96K, seven frames are stored in the buffer 110 each time.

As explained in FIG. 6, in the case of storing audio data in the buffer 110, when an audio source conversion or buffer flush action occurs, in the case of AC3, the length of time of the silence section is 32 ms, in the case of DTS, the length of time of the silence section is 32 ms, and in the case of PCM48K, the length of time of the silence section is 35 ms, and in the case of PCM96K, the length of time of the silence section is 35 ms, that is, all the lengths of time of the silence sections are in the range of 35±5 ms. Therefore, regardless of which type of audio source is being input, when the audio source is converted, the user will perceive that it takes the same time until he/she hears data of the next audio source.

Spec information of each audio source may be pre-stored in a storage of the electronic apparatus 100.

The storage of the electronic apparatus 100 may be implemented as for example, nonvolatile memory, volatile memory, flash-memory, hard disk drive (HDD) or solid state driver (SSD), and USB, etc. The storage is may be accessed by the processor 120, and reading/recording/modifying/deleting/updating data by the processor 120 may be performed in the storage.

Otherwise, the spec information of each audio source may be received from an external apparatus such as an external server through a communicator of the electronic apparatus 100.

Here, the communicator of the electronic apparatus 100 is configured to perform communication with various types of external apparatuses according to various types of communication methods, and may perform communication with the external apparatus via a local area network (LAN) and internet, or by a wireless method of Wi-Fi, Bluetooth and the like.

The processor 120 may calculate the reproducing time corresponding to the audio data stored in the buffer 110 based on the spec information of the audio source corresponding to the audio data stored in the buffer 110.

The spec information of the audio source may include information of the reproducing time per frame, in which case, the processor 120 may calculate the number of frames corresponding to the audio data stored in the buffer 110, and calculate the reproducing time of the audio data stored in the buffer 110 based on the calculated number of frames and the information of the reproducing time per frame.

As another example, the spec information of the audio source may include the information of the reproducing time per frame and information of the data size per frame, in which case, the processor 120 may calculate the size of the audio data stored in the buffer 110, and calculate the reproducing time of the audio data stored in the buffer 110 based on the information of the data size per frame and the information of the reproducing time per frame.

Hereinafter, the method for calculating the reproducing time of the audio data stored in the buffer 110 will be explained based on an example where the audio source is AC3. An assumption is made that when the audio source is AC3, the spec information of the audio source is as in Table 2 below.

TABLE 2

| Size of 1 Frame (a) | Number of samples per frame (b) | Number of channels (c) | Sampling frequency (d) |
|---|---|---|---|
| 192 * 60958 Frame (32 bit) | 1536 Samples | 5.1 (6) Ch | 48 KHz |

Further, variables needed in the calculation will be defined as shown below.

e: Size of the data in the buffer where the data is input (size)

f: Size of the data stored in the decoded buffer where the buffer where the data is input (size)

g: Number of channels

Through the aforementioned seven variables (a to g), four values may be obtained as shown below.

h: Reproducing unit time per frame=b/d (unit: second)

i: Amount of data per unit time=c*a j: Remaining reproducible time of buffer=(e/i)*h k: Reproducible time of decoded buffer=f/(d*g)

The reproducing time corresponding to the audio data stored in the buffer 110 may be calculated using j calculated above.

Besides the above, it is possible to decode the data of the buffer 110 (input buffer) using k and calculate the reproducible time of the data stored in the buffer (output buffer).

Figure 7:
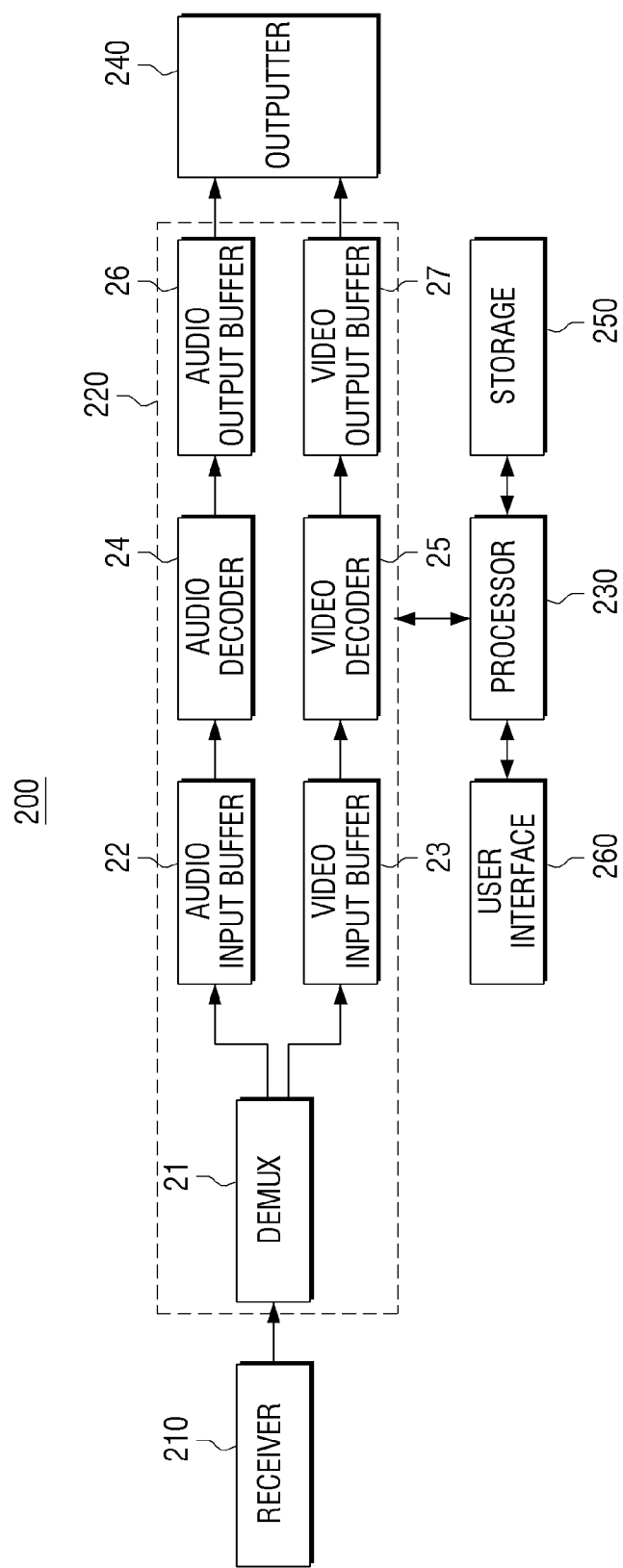
FIG. 7 is a block diagram provided to explain a configuration of an electronic apparatus according to another example embodiment.

FIG. 7 is a view provided to explain the electronic apparatus 200 according to another example embodiment.

The electronic apparatus 200 may be an electronic apparatus such as TV, DTV, PC, smart phone, tablet, DVD player, Blu-ray player and the like, that can reproduce multimedia data.

The electronic apparatus 200 includes a receiver 210, a signal processor 220, a processor 230, an outputter 240, a storage 250 and a user interface 260.

The receiver 210 is configured to receive contents data from various sources. For example, the receiver 210 may be implemented as a tuner that receives broadcasting contents data transmitted through a broadcasting network, or as an interface for receiving inputs of contents data read from a storage medium embedded in the electronic apparatus 200 or from an external storage medium connected to the electronic apparatus 200. For example, the receiver 210 may be implemented as an interface such as a USB and HDMI, etc. Besides these, the receiver 210 may include a network interface card for streaming or receiving downloading of the contents data from a server apparatus through an IP communication network.

According to an example embodiment, the contents data being received through the receiver 210 may correspond to the contents stored in the storage medium such as a CD, digital video disk (DVD) HD DVD, and Blu-ray disk (BD), etc. Specifically for example, the contents data being received through the receiver 210 may correspond to the contents being provided from a public TV, cable TV, satellite and the like recorded using a personal video recorder (PVR) function.

The contents data may be a transport stream (TS) where a plurality of elementary streams (ES) combined as one single stream are multiplexed.

The contents data received through the receiver 210 is provided to the signal processor 220. The signal processor 220 includes a demultiplexer (demux) 21, audio input buffer 22, video input buffer 23, audio decoder 24, video decoder 25, audio output buffer 26 and video output buffer 27.

The demultiplexer 21 may demultiplex the contents data received through the receiver 210 and divide the demultiplexed contents data into audio stream, video stream and other data. Through a series of processes that will be explained hereinafter, the audio corresponding to the audio stream and the video corresponding to the video stream may be output through the outputter 240. The other data may be data excluding the audio stream and the video stream, that is, program data and the like.

The demultiplexer 21 may be implemented as a TS demultiplexer. In this case, the TS demultiplexer may demultiplex a TS packet being received and divide the demultiplexed TS packet into audio stream and video stream.

The processor 230 stores the audio stream of a certain unit data in the audio input buffer 22, and stores the video stream of a certain unit data in the video input buffer 22. The audio input buffer 22 and the video input buffer 22 may be implemented in a queue structure.

The audio input buffer 22 and the video input buffer 22 perform the function of storing the demultiplexed data of an amount of data that can be processed in the audio decoder 24 and the video decoder 25 at a rear end.

In this case, the processor 230 may calculate the reproducing time corresponding to the audio data stored in the audio input buffer 22, and compare the calculated reproducing time and a predetermined reproducing time and control the storage amount of audio data stored in the audio input buffer 22 such that the amount of audio data corresponding to the predetermined reproducing time can be maintained.

Specifically, according to an example embodiment, spec information of each audio source may be stored in the storage 250, and the processor 230 may calculate the reproducing time corresponding to the audio data stored in the audio input buffer 22 based on the spec information of the audio source corresponding to the audio data stored in the audio input buffer 22 of the spec information of each audio source stored in the storage 250. The reproducing time corresponding to the audio data stored in the audio input buffer 22 may be calculated using j value derived through the method explained above with reference to Table 2.

The audio decoder 24 decodes the audio data stored in the audio input buffer 22. The video decoder 25 decodes the video data stored in the video input buffer 23.

The decoded audio data is stored in the audio output buffer 26, and the decoded video data is stored in the video output buffer 27. The decoded video data stored in the audio output buffer 26 and the decoded video data stored in the video output buffer 27 are synchronized to each other and are output through the outputter 240.

The processor 230 may calculate the reproducing time corresponding to the decoded audio data stored in the audio output buffer 26. Specifically, the reproducing time corresponding to the decoded audio data stored in the audio output buffer 26 may be calculated using k value derived through the method explained above with reference to Table 2.

The outputter 240 may include a speaker that outputs audio and a display that outputs video. Otherwise, the outputter 240 may be configured to transmit the decoded audio data and the decoded video data to an external apparatus so that the audio and the video may be output from the external apparatus. In this case, the outputter 240 may include various communication interfaces for communicating with the external apparatus, for example, an interface or wired interface for various wireless communication such as Wi-Fi, Bluetooth, NFC and the like.

The processor 230 is configured to control the overall operations of the components that form the electronic apparatus 200. The processor 230 may include a CPU, a RAM, a ROM and a system bus. The processor 230 may be implemented as a MICOM, an ASIC, etc.

When an audio source conversion command is input, the processor 230 may remove the audio data stored in the audio input buffer 22, and store, in the buffer 22, the audio data of a converted source of an amount corresponding to the predetermined reproducing time.

Specifically, when a command for converting the language of the audio corresponding to the video currently being output through the outputter 240 is input, the processor 230 may remove the audio data stored in the audio input buffer 22, that is, perform a flush, and store, in the audio input buffer 22, the audio data corresponding to the converted language of an amount corresponding to the predetermined reproducing time.

For example, in a situation where a movie is currently being output in French, when the user inputs a command for converting the language to English, the processor 230 may remove the audio data corresponding to French stored in the audio input buffer 22, and store, in the audio input buffer 22, the audio data corresponding to English of an amount corresponding to the predetermined reproducing time.

Such a source conversion command or a language conversion command may be input through the user interface 260.

The user interface 260 is configured to receive a user command, and may be implemented in various forms depending on the realized example of the electronic apparatus 200. In the case where the electronic apparatus 200 is realized as a TV, the user interface 260 may be realized as a remote receiver, but in the case where the electronic apparatus 200 is realized as a touch-based terminal such as a smart phone, tablet and the like, the user interface may be realized as a touch screen. In some cases, instead of the user command being directly received in the electronic apparatus 200, it may be input through an external apparatus connected to the electronic apparatus 200 and then transmitted to the electronic apparatus 200. In such a case, the user interface 260 may not be provided in the electronic apparatus 200.

The storage 250 may be implemented as a nonvolatile memory, volatile memory, flash-memory, hard disk drive (HDD) or solid state drive (SSD), etc. The storage 250 may be accessed by the processor 230, and reading/recording/modifying/deleting/updating data by the processor 230 may be performed in the storage. The storage 250 may be realized as not only a storage medium inside the electronic apparatus 200, but also as an external storage medium, for example, a web server through a USB or network. In the storage, an O/S or program such as various applications, user setting data, data created in the process of executing an application, and various data such as multimedia contents data and the like may be stored. Especially, in the storage 250, the spec information of each audio may be stored. Further, in the storage 250, contents recorded using the personal video recorder (PVR) function may be stored.

In the related art, a method of setting a certain size of data or a certain number of frames to be stored in the buffer, and then checking whether or not the audio data filled in the buffer has reached the set data size or the number of frames is used, in which case, data of different reproducing times depending on the type of ES codec is loaded in the buffer, and thus there was a problem where, if a buffer flush occurs, the time since filling the next audio data in the buffer until a normal audio reproduction differs per codec and sampling frequency. However, according to the aforementioned various example embodiments, it is possible to maintain the same reproducing time of the audio data being stored in the buffer utilizing the codec and the sampling frequency even when the audio source is different, and thus there is an advantage where, if a buffer flush occurs, the time since filling the next audio data in the buffer until a normal audio reproduction does not change per codec and sampling frequency.

Figure 8:
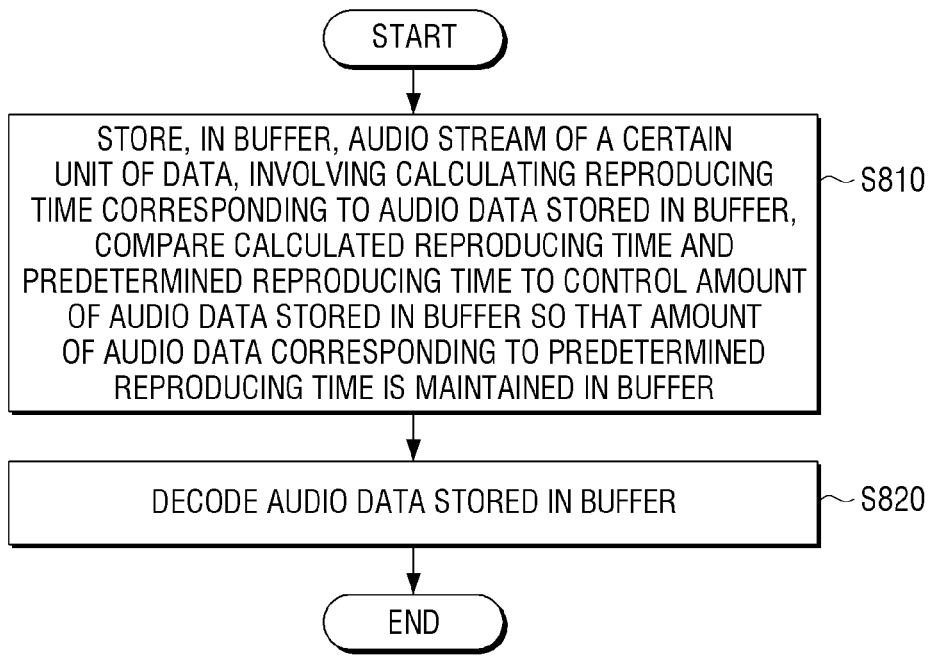
FIG. 8 is a flowchart provided to explain a controlling method of an electronic apparatus according to an example embodiment.

FIG. 8 is a flowchart provided to explain a controlling method of an electronic apparatus according to an example embodiment. The flowchart illustrated in FIG. 8 may consist of the operations being processed in the electronic apparatus 100, 200 explained with reference to FIGS. 1 to 7. Therefore, even the description omitted hereinafter may be applied to the flowchart illustrated in FIG. 8 with reference to FIGS. 1 to 7.

The controlling method of the electronic apparatus illustrated in FIG. 8 includes an operation of storing audio stream of a certain unit data in a buffer (S810) and an operation of decoding the audio data stored in the buffer (S820).

Before the operation of storing the audio stream of a certain unit data in the buffer (S810), the electronic apparatus may perform an operation of demultiplexing the input contents data and dividing the demultiplexed contents data into audio stream and video stream. Thereafter, the electronic apparatus may store the divided audio stream of a certain unit data in the buffer.

Here, the contents data input in the electronic apparatus are those where an entirety of the contents data are pre-stored in a record medium such as contents stored in a Blu-ray disc (BD) or digital video disc (DVD), or contents recorded using a personal video recorder (PVR). For such contents to be reproduced, the electronic apparatus needs to perform a control of the audio-video sync.

At the operation of storing the audio stream of a certain unit data in the buffer (S810), the operation of calculating the reproducing time corresponding to the audio data stored in the buffer, and an operation of comparing the calculated reproducing time and a predetermined reproducing time and controlling the storage amount of the audio data in the buffer 110 so that the amount of audio data corresponding to the predetermined reproducing time can be maintained can be performed.

The electronic apparatus may store the spec information of the audio source corresponding to the audio stream, and at the operation of storing the audio stream of a certain unit of data in the buffer (S810), an operation of calculating the reproducing time corresponding to the audio data stored in the buffer based on the spec information of the stored audio source may be performed.

According to an example embodiment, the spec information of the stored audio source may include information on the reproducing time per frame, in which case, at the operation of storing the audio stream of a certain unit data in the buffer (S810), an operation of calculating the number of frames corresponding to the audio data stored in the buffer, and calculating the reproducing time of the audio data stored in the buffer based on the information of the calculated number of frames and the reproducing time per frame may be performed.

According to another example embodiment, the spec information of the stored audio source may include information of the reproducing time per frame and information of the data size per frame, in which case, at the operation of storing the audio stream of a certain data unit in the buffer (S810), an operation of calculating the size of the audio data stored in the buffer and calculating the reproducing time of the audio data stored in the buffer based on the information of the data size per frame and the information of the reproducing time per frame may be performed.

Thereafter, when an audio source conversion command is input, an operation of removing the audio data stored in the buffer and storing, in the buffer, the audio data of an amount corresponding to the predetermined reproducing time may be performed.

Further, when a command for converting the language of the audio corresponding to the video currently being output is input, an operation of removing the audio data stored in the buffer and storing, in the buffer, the audio data corresponding to the converted language of an amount corresponding to the predetermined reproducing time may be performed.

The method of the various example embodiments mentioned above may be implemented by merely upgrading a software a conventional electronic apparatus.

Further, the various example embodiments mentioned above may be performed through an embedded server provided in an electronic apparatus or through a server provided outside the electronic apparatus.

According to the various example embodiments mentioned above, there is an advantage that, by changing the reference being applied when feeding the audio stream in the buffer according to the related art, a buffer level corresponding to the same reproducing time can be secured. Especially, it is possible to secure the same reproducing time by taking into consideration the spec characteristics of the PCM/ES (Elementary Stream).

The various example embodiments explained above may be implemented in a record medium that can be read by a computer or an apparatus similar thereto using software, hardware or a combination thereof. According to realization in terms of hardware, the example embodiments may be implemented using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. According to realization in terms of software, the example embodiments such as the procedures and functions explained in the present disclosure may be implemented by separate software modules. Each of the software modules may perform one or more functions and operations explained in the present disclosure.

A non-transitory computer readable medium may be provided where a program for sequentially performing the controlling method is stored.

For example, a non-transitory computer readable medium may be provided that performs the controlling method including the operation of storing, in the buffer, the audio stream of a certain unit data each time, and the operation of decoding the audio data stored in the buffer, wherein the operation of storing includes the operation of calculating the reproducing time corresponding to the audio data stored in the buffer, and the operation of comparing the calculated reproducing time and the predetermined reproducing time and controlling the storage amount of the audio data in the buffer so that the audio data amount corresponding to the predetermined reproducing time can be maintained in the buffer.

The non-transitory computer readable medium refers to not a medium that stores data for a short period of time such as a register, cache, memory and the like, but a medium readable by devices and that stores data semi-permanently. Specifically, the aforementioned various middleware or programs may be stored in a non-transitory computer readable medium such as a CD, DVD, hard disk, Blu-ray disk, USB, memory card, ROM and the like may be provided.

The foregoing embodiments and advantages are merely exemplary and are not to be construed as limiting the inventive concept. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic apparatus comprising:
a buffer storing audio data of an audio stream; and
a processor configured to:
identify a reproducing time length of the audio data stored in the buffer,
compare the identified reproducing time length of the audio data stored in the buffer and a preset constant time length, and
control an amount of the audio data in the buffer so that the reproducing time length of the audio data stored in the buffer corresponds to the preset constant time length,
wherein the processor is further configured to, in response to a user command for reproducing second audio data being received while first audio data is being reproduced, remove the first audio data stored in the buffer and store, in the buffer, the second audio data corresponding to the preset constant time length.

2. The electronic apparatus according to claim 1, further comprising a memory configured to store specification information of an audio source corresponding to the audio stream,
wherein the processor is further configured to identify the reproducing time length corresponding to the audio data stored in the buffer based on the specification information of the audio source.

3. The electronic apparatus according to claim 2, wherein the specification information of the audio source comprises information of the reproducing time per frame, and
the processor is further configured to identify a number of frames corresponding to the audio data stored in the buffer, and identify the reproducing time length of the audio data stored in the buffer based on the number of frames and the information of the reproducing time per frame.

4. The electronic apparatus according to claim 2, wherein the specification information of the audio source comprises information of the reproducing time per frame and information of a data size per frame, and
the processor is further configured to identify a size of the audio data stored in the buffer, and identify the reproducing time of the audio data stored in the buffer based on the size of the audio data, the information of the data size per frame and the information of the reproducing time per frame.

5. The electronic apparatus according to claim 1, further comprising an outputter configured to output audio and video,
wherein the processor is further configured to demultiplex input contents data, divide the demultiplexed contents data into the audio data and video data, store the audio data in the buffer, and output audio corresponding to the audio data and video corresponding to the video data through the outputter.

6. The electronic apparatus according to claim 5, wherein the processor is further configured to, in response to receiving a command for converting a language of the audio corresponding to the video currently output, remove the audio data stored in the buffer, and store, in the buffer, audio data corresponding to the converted language of an amount corresponding to the preset constant time length.

7. The electronic apparatus according to claim 5, wherein the input contents data correspond to contents stored in a Blu-ray disc (BD) or a digital video disc (DVD), or contents recorded using a personal video recorder (PVR).

8. A method of controlling an electronic apparatus, the method comprising:
storing audio data of an audio stream in a buffer;
identifying a reproducing time length of the audio data stored in the buffer;
comparing the identified reproducing time length of the audio data stored in the buffer and a preset constant time length; and
controlling an amount of the audio data in the buffer so that the reproducing time length of the audio data in the buffer corresponds to the preset constant time length,
wherein the method further comprises, in response to a user command for reproducing second audio data being received while first audio data is being reproduced, removing the first audio data stored in the buffer and storing, in the buffer, the second audio data corresponding to the preset constant time length.

9. The method according to claim 8, wherein the electronic apparatus stores specification information of an audio source corresponding to the audio stream, and the identifying the reproducing time comprises identifying the reproducing time corresponding to the audio data stored in the buffer based on the specification information of the audio source.

10. The method according to claim 9, wherein the specification information of the audio source comprises information of the reproducing time per frame, and
the identifying the reproducing time corresponding to the audio data stored in the buffer based on the specification information of the audio source comprises identifying a number of frames corresponding to the audio data stored in the buffer, and identifying the reproducing time of the audio data stored in the buffer based on the number of frames and the information of the reproducing time per frame.

11. The method according to claim 9, wherein the specification information of the audio source comprises information of the reproducing time per frame and information of a data size per frame, and
the identifying the reproducing time corresponding to the audio data stored in the buffer based on the specification information of the audio source comprises identifying a size of the audio data stored in the buffer, and identifying the reproducing time of the audio data stored in the buffer based on the size of the audio data stored in the buffer, the information of the data size per frame and the information of the reproducing time per frame.

12. The method according to claim 8, further comprising demultiplexing input contents data and dividing the demultiplexed contents data into the audio data and video data; and
outputting audio corresponding to the audio data and video corresponding to the video data,
wherein the storing the audio data in the buffer comprises storing the demultiplexed and divided audio stream of a certain unit data in the buffer.

13. The method according to claim 12, further comprising, in response to receiving a command for converting a language of the audio corresponding to the video currently being output, removing the audio data stored in the buffer, and storing, in the buffer, audio data corresponding to the converted language of an amount corresponding to the preset constant time length.

14. The method according to claim 12, wherein the input contents data correspond to contents stored in a Blu-ray disc (BD) or a digital video disc (DVD), or contents recorded using a personal video recorder (PVR).

15. A non-transitory computer readable record medium storing a program instructions that are executed by a computer to perform a method of controlling an electronic apparatus, the method comprising:
storing audio data of an audio stream in a buffer;
identifying a reproducing time length of the audio data stored in the buffer;
comparing the identified reproducing time length of the audio data stored in the buffer and a preset constant time length; and
controlling an amount of the audio data in the buffer so that the reproducing time length of the audio data in the buffer corresponds to the preset constant time length,
wherein the method further comprises, in response to a user command for reproducing second audio data being received while first audio data is being reproduced, removing the first audio data stored in the buffer and storing, in the buffer, the second audio data corresponding to the preset constant time length.

* * * * *